Lawrence A. Smith &
Howard F. Gamble
INVENTORS

Lawrence A. Smith &
Howard F. Gamble
*INVENTORS*

BY James M. Clark

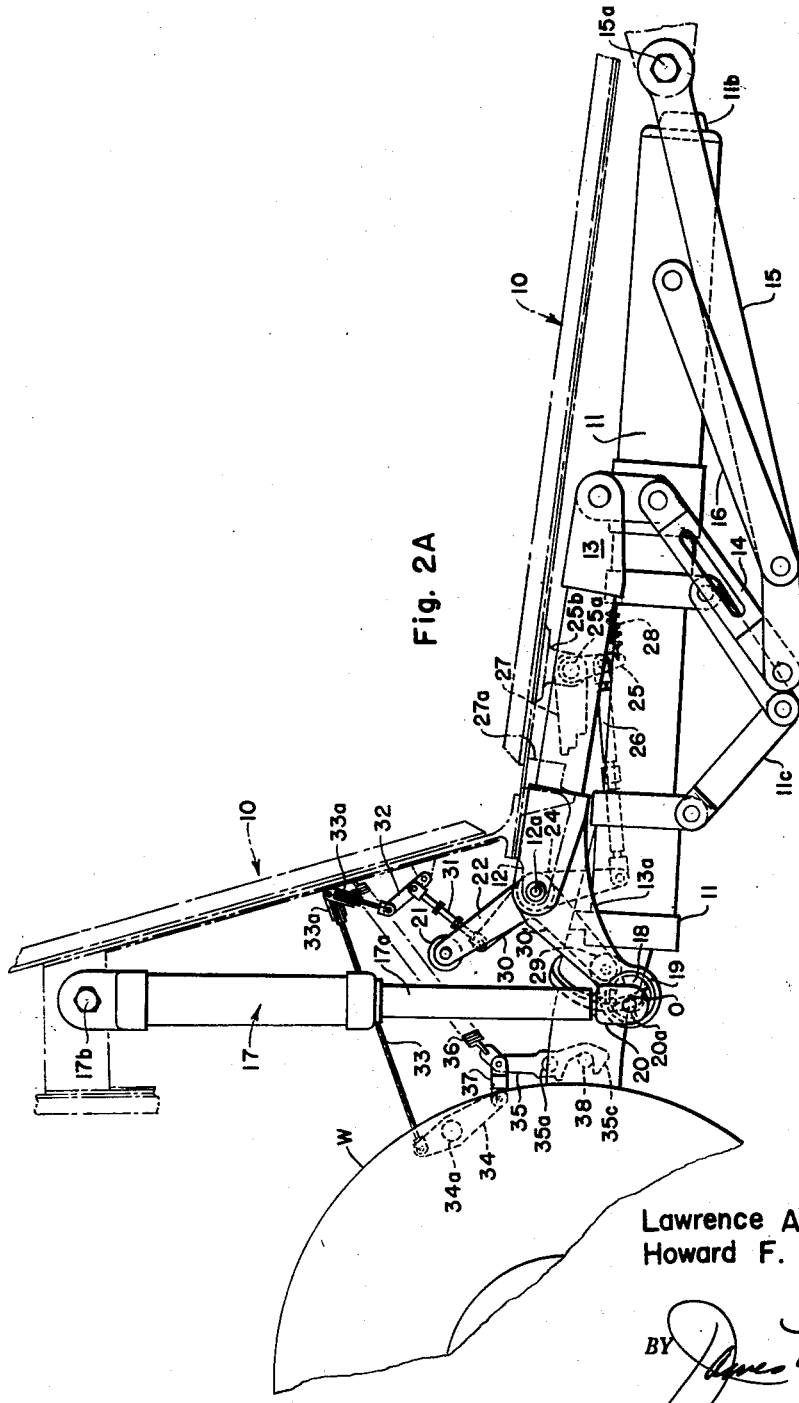

UNITED STATES PATENT OFFICE 2,668,030

AIRCRAFT LANDING GEAR LOCK

Lawrence A. Smith, Florissont, and Howard F. Gamble, Ferguson, Mo., assignors to Curtiss-Wright Corporation, a corporation of Delaware Application December 15, 1948, Serial No. 65,368

8 Claims. (Cl. 244—102)

The present invention relates generally to latches and locks and more particularly to improvements in latching and locking mechanisms for movable members such as retractable landing gears and the like.

In the operation of retractable landing gears, it is desirable that the landing gear be securely latched or locked in both its extended and retracted positions, and that such latches be sturdy, positive and foolproof in action. In the provision of latching devices for such landing gears, it is also desirable that the latches be automatic in their operation such that when the actuating means starts to operate its initial movement will unlock the landing gear before the operational stroke begins to move the gear; and also that when the actuating means reaches the end of its operational stroke the landing gear is locked in that position, without the necessity of the pilot or crew member in either instance having to operate a further locking control. A number of prior and existing mechanisms have been proposed and used for automatically latching and unlatching landing gear units in both the retracted and extended positions utilizing electrical, hydraulic or mechanical means but most of these prior systems have been found objectionable in certain respects due to operational failures, lack of simplicity, difficulty of servicing, and for other reasons. The present invention is directed to a relatively simple, partially rotatable eccentric connection, having the effect of a lost-motion or sequence determining means, normally interconnecting the actuating means with the landing gear strut in such manner that the initial movement of the actuating means imparts locking or unlocking movement to the latching mechanism and further movement is applied as an operational stroke to the strut for retraction or extension of the landing gear.

It is accordingly a primary object of this invention to provide a simplified and positive acting mechanical means for latching and unlatching a retractable landing gear in either, or both, its retracted and extended positions. It is a further object to provide means for positively imparting latching or unlatching movements from an actuating motor prior to the application of any operational movement to the landing gear strut to which the motor is connected. A further object of this invention resides in the provision of an improved partially rotatable eccentric connection between an actuating motor and the member to be moved in an arrangement in which the improved connection is disposed in a protected relationship and not subject to becoming fouled with other mechanism, or otherwise made inoperative.

Other objects and advantages of the present invention will become apparent to those skilled in the art after reading the following description, taken in conjunction with the accompanying drawings, forming a part hereof, in which:

Fig. 2A is a similar view of the complete landing gear unit in its retracted position;

Figure 1:
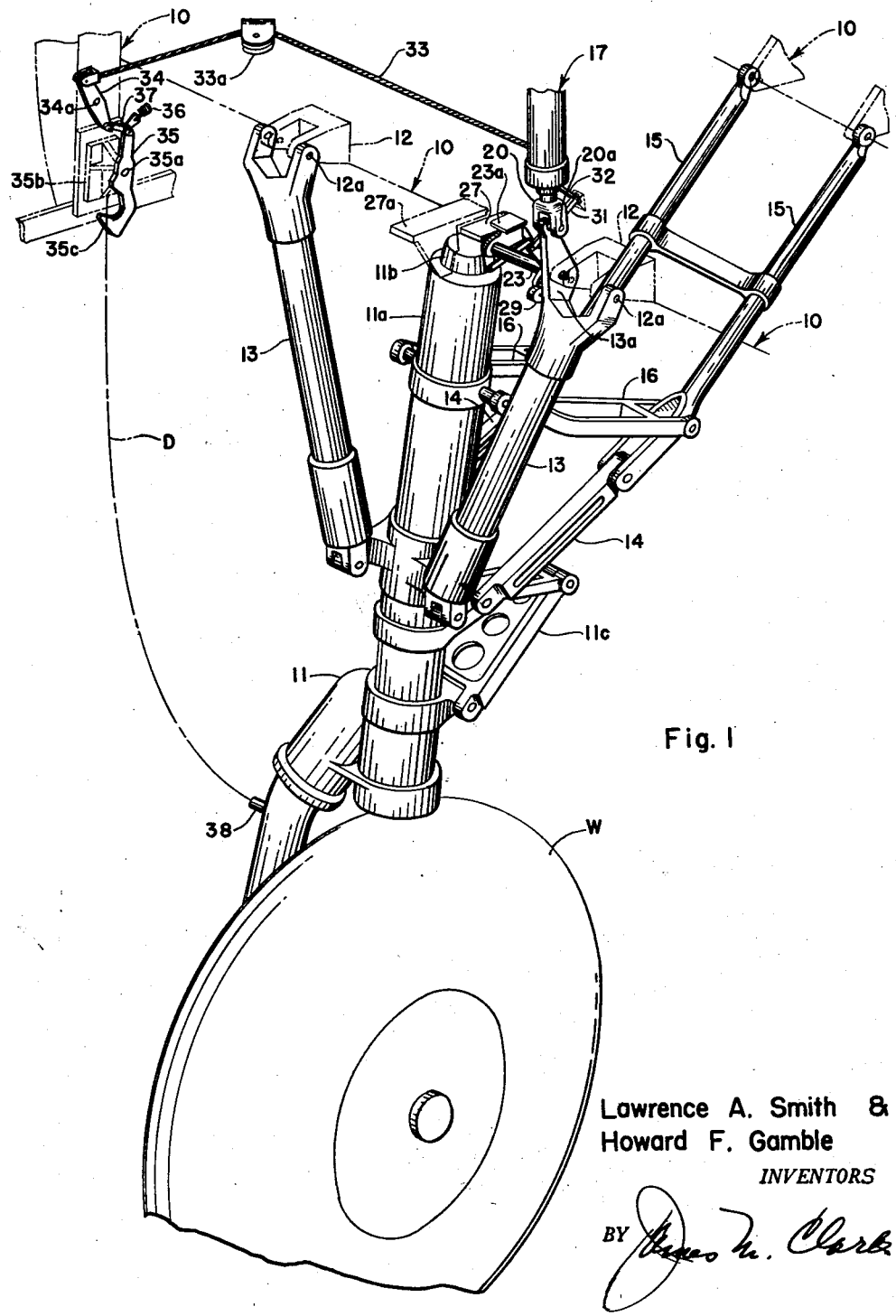
Fig. 1 is a perspective view of a complete landing gear unit, in its extended position, to which the improved latching means of the present invention has been applied.

Referring now to Fig. 1, there is shown a retractable landing gear unit in its extended position suspended from an aircraft structure, shown fragmentarily at 10, having a main strut 11 carrying the ground engaging wheel W at its lower extremity resiliently reciprocable within its upper cylinder portion 11a. It should be mentioned at this point that the present landing gear unit has been selected for explanatory purposes only and that the improved latching means of the present invention is applicable to other types of landing gears than that which has been shown. The main support fittings 12, fixedly attached to the aircraft structure 10, form the pivotal support for the side braces or arms 13 which are pivotally connected to the main strut cylinder portion 11a, the upper terminal of which is permitted to swing bodily in a rearward direction or to the right in Figs. 1 and 2 as the wheel W is drawn upwardly and forwardly, or to the left in these figures, as the landing gear is retracted to the position shown in Fig. 2A. The main strut cylinder portion 11a is articulated to the piston portion 11 by the nutcracker or anti-torque linkage 11c which permits relative axial movement between the main strut portions while preventing relative rotational movement about their common axis.

The main strut cylinder portion 11a is braced rearwardly by the drag strut links 14, the drag brace strut elements 15, pivotally connected to the aircraft structure at the pivots 15a, and the interconnecting links 16. The side braces 13 are provided with upper terminal portions which are pivotally connected to the main supports 12 by means of the main pivots 12a, about which they are rotatable and one of the side braces 13 is provided with an extended terminal portion 13a which is pivotally connected to the actuating motor 17, having a piston 17a, which provides the source of power required for the retraction or extension of the landing gear, as well as the locking functions. The cylinder portion of the actuating motor 17 is pivotally connected to the aircraft structure 10 at the pivot 17a. The present improvement resides essentially in the interconnection between the actuating motor 17 and the extended arm portion 13a, or other landing gear part to which the retractive forces may be applied, as well as in the associated mechanism by means of which the latches are operated.

From the extended position shown in Fig. 1, and subsequent to the release of the down-lock to be described in detail below, the landing gear is retracted by the downward force applied by the actuating motor 17 imparting counterclockwise rotation to the arms 13 about their pivotal axis 12a in such manner that the rearward movement of the lower terminals of the arms 13 cause breaking of the drag strut assembly 14—15, the links 16 pulling the upper free terminal of the main strut cylinder portion 11a rearwardly or to the right and causing the wheel W to be lifted upwardly and forwardly to its retracted position. The actuating motor 17 is shown as a hydraulic piston-cylinder unit, although actuating motors of the electrical, mechanical or other types are equally adapted for use with the present improvement.

The piston 17a of the hydraulic motor cylinder 17 terminates in a clevis fitting 20 which is bored to receive a transverse pin 20a and the aforementioned arm extension 13a is provided with a bushing or housing 19 fixed therein within which the cam or disc 18 is partially rotatable. The pivotal connection between the arm 13a and the clevis fitting 20 is more fully shown in the cross-section in Fig. 4, in which it will be noted that the terminal of the arm is provided with an enlarged bore to receive the cylindrical outer surface of the detent bushing 19. This bushing is adjustably rotatable within the bored hole in the arm 13a, and when adjusted to its proper position, it is suitably locked as by set screws or other means (not shown) in a fixed relationship with respect to the arm 13a. The inner surface of the detent bushing 19 is partially cylindrical and concentric with its outer surface but is interrupted by two detents or broached dog portions 19a which are opposed to each other, or disposed such that their centers are 180° apart. The cam or disc 18 is shaped with cylindrical outer surfaces such that it is partially rotatable within a predetermined angle about its center which is concentric with the inner and outer cylindrical surfaces of the bushing 19, such that its partial rotation is interrupted by its extended portions 18a meeting the detents or dogs 19a formed on the bushing 19. The cam disc 18 is eccentrically bored, or offset with respect to its center O, to receive the pin 20a carried by the clevis fitting 20. The eccentric disc 18 having its normal center at O, and the offset or eccentric pin 20a, provides an automatic sequence means for imparting unlatching movements to the landing gear latches prior to the application of its main or operational retractive force. It, accordingly, also serves as a lost-motion device in this respect in that the initial extensive force applied by the actuating motor 17 is lost or becomes ineffective as far as the operational retraction of the unit is concerned.

Figure 4:
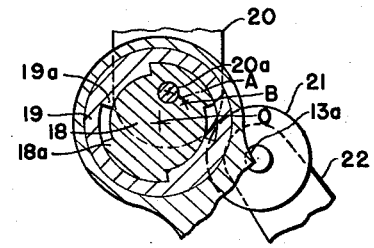
Fig. 4 is a sectional view taken along the lines 4—4 of Fig. 3.
Figure 3:
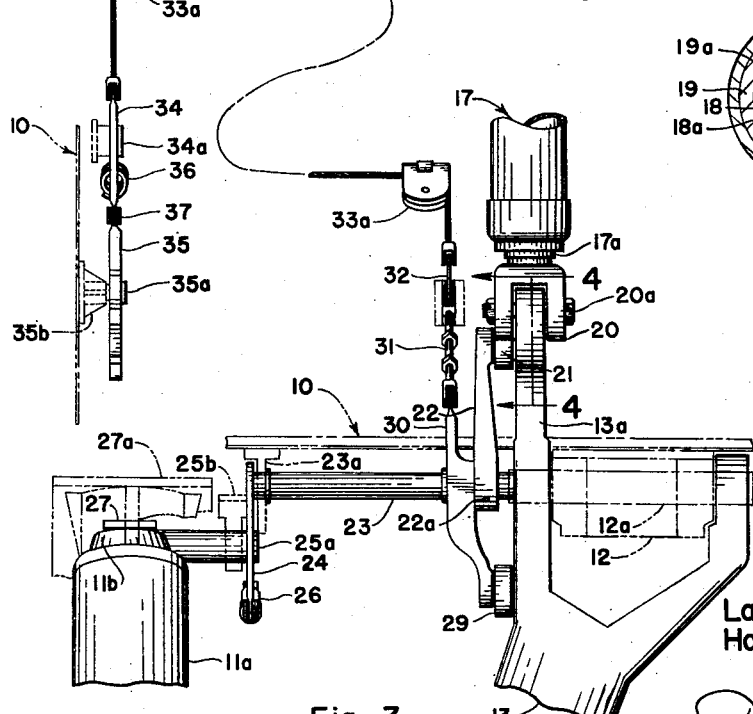
Fig. 3 is a front elevational view of the latching mechanism of Fig. 2.

The operation will be more readily understood by reference to Fig. 4, wherein it is noted that the axis of the pin 20a is well above but slightly to the right of the center O of the eccentric disc 18. As the downward extensive force is applied to the actuating motor 17 through its piston 17a and the clevis 20, the pin 20a likewise tends to move downwardly, but this force is initially expended in partially rotating the disc 18 in the clockwise direction until it strikes the inwardly extending detents or dogs 19a, the axis of the pin 20a in the meantime following the arcuate path A. Inasmuch as the upper terminal of the actuating motor 17 is pivotally mounted upon the aircraft structure, this pivot not being shown in the drawings, the lower terminal and pivot 20a is free to swing rearwardly as the clevis 20 is extended downwardly until the axis of the pin 20a reaches the position indicated at B at which the eccentric disc 18 is prevented from further rotational movement by the engagement of the detents 18a and 19a. Accordingly, as the pivot 20a moves downwardly and to the right of the center O to its final position B at which the disc 18 is opposed in its further rotation, no movement is imparted to any portion of the landing gear structure other than the partial rotation of the eccentric disc 18 about the center O, which remains at the same point in space.

The movement of the pin 20a, however, is availed of by interposing in its path the roller 21 which is pivotally mounted upon the lever 22 in such position that it is in engagement with the semi-circular end portion of the terminal clevis 20. The lever 22 is fixedly attached to the torque tube 23 as by the set screw 22a, the tube 23 being journalled in the fitting 23a to rotate about the same axis as the main pivots 12a. A lever 24 is also fixedly mounted at the far terminal of the tube 23 and is pivotally connected to the push-rod 26, which in turn is pivotally connected to the arm 25, pivotally mounted at 25a within the bearing fitting 25b. A down-latch 27 is fixedly mounted upon the pin 25a to positively retain the main strut cylinder portion 11a in the extended position by engagement of its upper projection 11b. An abutment fitting 27a, shown in Figs. 1 and 2, limits the forward movement of the cylinder portion 11a such that in the extended position of the gear as shown in Fig. 1, the upper end of the main strut is effectively restrained from movement in any direction by the cooperative efforts of the down-latch 27 and the down-latch stop or abutment 27a. A tension spring 28, extending between the lower terminal of the arm 25 and the aircraft structure, tends to rotate this arm and the attached down-latch 27 continually in the counterclockwise direction in which the terminal of the down-latch engages the upper projection 11b of the strut.

This position of the down-latch 27 is only affected by the above mentioned arcuate movement of the pin 20a causing the clevis end 20 to bear against the roller 21 to rock the tube 23 sufficiently to impart clockwise movement to the shaft 25a, and the attached down-latch 27, for the release of the upper end of the main strut 11a. It will be apparent that further downward movement of the piston 17a, of the actuating cylinder and its terminal defined by the pin 20a, will impart counterclockwise rocking movement of the extended arm portion 13a about the main pivots 12a with the center O of the eccentric disc 18 moving along the arcuate path C to thereby effect retraction and folding of the landing gear unit. As the actuating motor is extended and the clevis 20 moves downwardly, the roller 21 which is deflected toward the right in Fig. 2, rolls up alongside the flat side face of the clevis 20 until the movement of the latter along the arcuate path C causes it to move forwardly away from the roller 21, which is returned to its original position by the action of the tension spring 28.

A similar roller 29 is pivotally mounted upon a lever 30, which is freely pivotable upon the tube 23, the opposite or upper terminal of the lever 30 being pivotally connected to the adjustable link 31, which in turn is pivotally connected to the link 32 having a terminal connected to the actuating cable 33. This cable is guided by the sheaves 33a, which are mounted upon the aircraft structure 10, and it terminates at its opposite end in a terminal of a lever 34 which is pivotally mounted upon the pivot 34a. The lever 34 is pivotally connected at its opposite terminal to the up-latch hook 35 by means of the intermediate link 37, the junction with which is placed under tension or biased by the tension spring 36. The up-latch hook 35 is pivotally mounted upon the pin 35a supported within the bracket fitting 35b and the lower outer surface of the hook is provided with a cam face 35c. As shown in Fig. 1, as well as in Fig. 2, the wheel-carrying strut 11 is provided with a laterally extending pin or projection 38 disposed such that it is engaged by the up-latch hook 35. As the landing gear is retracted by the abovementioned downward extension of the actuating motor 17, the pin 38 follows the path indicated by the line D in Fig. 2, and as it nears its fully retracted position it engages the angular cam face 35c temporarily deflecting the latch hook 35 against the opposition of the spring 36 until it passes into the hook portion wherein the spring reasserts itself and the pin 38 is latched in the "up" position of the retracted landing gear.

Figure 2:
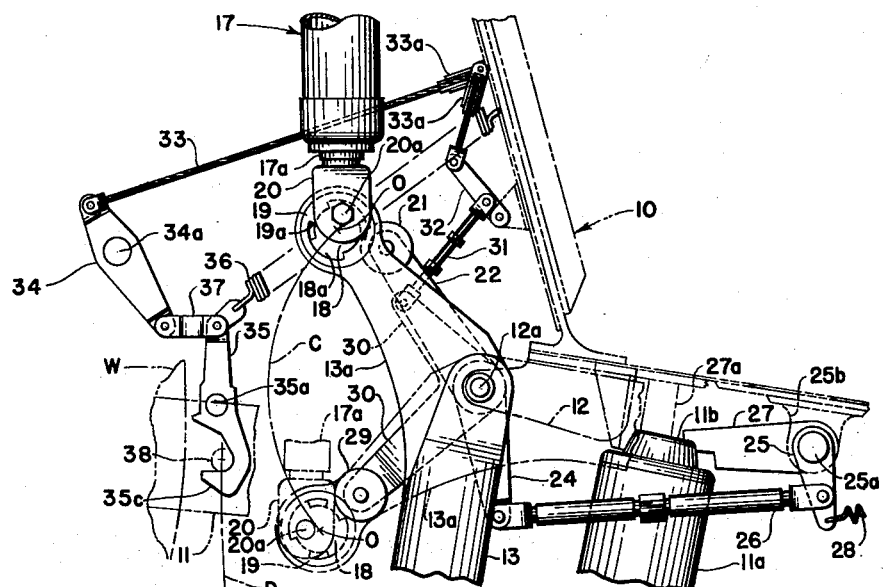
Fig. 2 is an enlarged side elevational view of the improved latching means applied to the landing gear of Fig. 1.

During the extension of the actuating cylinder 17 and the concurrent retraction of the landing gear unit, after the down-latch has been tripped as described above, the pin 20a which imparts the retractive force to the arm 13a initially transmits this force at the beginning of the retractive cycle by a tendency to rotate the eccentric disc 18 in the clockwise direction as viewed in Fig. 2, which rotation is opposed by the detents 18a and 19a and the force is accordingly positively transmitted to the arm 13a. However, during this retractive cycle, and due to the rotation of the arm 13a about the pivot 12a, the center O of the eccentric disc 18 gradually assumes a position in which it is along the extended axis of the cylinder 17 and the axis of the pin 20a. As the point O passes beyond, or to the left of this axis, the pin 20a will be caused to freely rotate the eccentric disc 18 momentarily in the counterclockwise direction until it is opposed again by the opposite faces of the detents or lugs 19a. The positive force transmitted by the pin 20a to the arm 13a is again resumed until the arm 13a is moved down to the dotted position of Fig. 2, in which it is noted that the pin 20a is now disposed to the left of the center O of the eccentric disc 18 which is in engagement with the same faces of the detent 19a as it was at the top of Fig. 2, before the tripping of the up-latch, or at the completion of the extension cycle.

The roller 29 is also disposed such that, at the end of the retraction cycle, it is relatively close or contiguous to the flat side face of the clevis 20 and the initial upward withdrawing movement of the piston 17a of the actuating cylinder 17 causes the disc 18 to rotate in the clockwise direction about the center O. This causes the pin 20a to move from the position shown in the lower dotted portion of Fig. 2 to a position above that shown in which the disc 18 has been rotated in the clockwise direction about the center O causing the clevis 20 to move to the right, deflecting the roller 29 and its arm 30 in the counterclockwise direction about its pivot tube 23. This deflection of the arm 30 causes releasing movement or tripping of the up-latch hook 35 permitting the pin 38 to pass downwardly from the hook and continued upward movement of the clevis 20 now imparts positive upward movement of the arm 13a due to the positive engagement of the eccentric disc 18 with the opposite faces of the detents 19a. During this extension cycle of the landing gear by the contracting movement of the cylinder 17, the center O will again move outwardly into the line of the axis of the cylinder 17 and that of the pin 20a, but as the upward movement of the pin 20a continues, it will gradually cause the disc 18 to move again in the counterclockwise direction with respect to the bushing 19 such that at the end of the extension cycle these parts will again bear the same relationship as shown at the top of Fig. 2, in the full lines, prior to the beginning of the downward movement of the cylinder 17. As the gear continues to be extended, the upper projection 11b of the strut cylinder portion will pass forward beneath the down-latch 27 deflecting the same against the tension of the spring 28 until the upper projection 11b engages the abutment fitting 27a. At this point, inasmuch as the roller 21 has been permitted to move outwardly under the rounded portion of the clevis 20, the spring 28 is permitted to pull the down-latch 27 in the counterclockwise direction to the positon shown in Fig. 2 in which it positively engages the projection 11b of the strut and retains the same firmly between the down-latch and the abutment 27a. In the meantime, the roller 29 controlling the up-latch mechanism has again returned to its extended position under the influence of the spring 36 and the up-latch is accordingly conditioned for the next cycle of extension and retraction operations.

It will accordingly be noted that the presently improved latch operating mechanism automatically imparts during its inital movement the unlatching or tripping of the respective latch prior to the operational extension or retraction of the landing gear unit. This is done automatically and without interruption to the retraction motor thereby simplifying the motor controls and relieving the operator of the burden of additional latching controls. Where desired, position indicating means may be installed to indicate visually to the operator the position of the landing gear and the locked or unlocked condition of the respective up- and down-latches. As indicated above, the present improvement is adapted for use with landing gears which retract by other methods than those shown and described and it is also adapted for use with other latch mechanisms.

Other forms and modifications of the present invention, both with respect to its general arrangement and the details of its respective parts, are intended to come within the scope and spirit of this invention as more particularly set forth in the appended claims.

We claim:

1. In a latching arrangement: a first movable member pivotally mounted upon a support; a second movable element pivotally associated with said first movable member for movement to and from an initially locked position; said second movable member having a detent portion; latch means including resilient means for urging the same into engagement with said detent portion for locking said second movable member in said initial position; said first movable member provided with an opening defined by a part-cylindrical surface interrupted by an intermediate portion defined by a part-cylindrical surface of lesser diameter; a lost-motion element having part-cylindrical outer surfaces arranged to be rockably mounted within the opening in said first movable member in engagement with the part-cylindrical surface thereof; an actuating member pivotally connected to said lost-motion element at a point eccentric with respect to the center of said part-cylindrical surface; said rockable relationship between said lost-motion element and said first movable member being limited by said intermediate portion as defined by said lesser diameter part-cylindrical surface; the relationship of the component elements of the latching arrangement being such that initial force applied to said actuating member imparts rocking movement to said lost-motion element about its center and imparts a lateral component of movement to said actuating member without imparting movement to said first movable member; said lateral movement of said actuating member causing engagement with said latch means and disengagement of said detent portion for unlocking of said second movable member and further movement of said actuating member is transmitted directly by said lost-motion element to said first movable member at the interrupted limit of said rocking movement by said intermediate portion for rotation of said first member about its pivotal mounting.

2. In a latching assembly: a first movable member pivotally mounted upon a support for rotational movement; a second movable member having a detent portion carried thereby; said first movable member operatively connected to said second movable member latch means engageable with said second member detent portion at an extreme rotated position of said second movable member for locking said second member at said position; said first movable member having a bore formed therewithin on an axis spaced from said pivotal mounting of said movable member; an element journalled for partial rotation within said first movable element bore; stop means for limiting the relative rotation between said element and said first movable member; actuating means pivotally connected to said rotational element at a point spaced from its center of rotation arranged in such manner that movement of said actuating means initially imparts relative rotation of said element within said bore and with respect to said first movable member without imparting movement to said first movable member, said initial relative movement of said actuating means causing disengagement of said latch means from said detent portion for unlocking said second movable member at said extreme position and further movement of said actuating means opposed by said stop means for limiting said relative rotation causing direct engagement of said actuating means with said element and said first movable member for rotation thereof about its pivotal mounting and retracting movement of said second movable member in its released condition with respect to said latch.

3. A latching assembly for an aircraft landing gear comprising: an aircraft structure; a landing gear assembly pivotally mounted upon said aircraft structure; a rotatable disc journaled in a bore formed within a portion of said landing gear assembly spaced from said pivotal mounting; said disc having a transverse bore eccentrically disposed with respect to the axis of said disc; an eccentric pivot rotatably engaging said transverse bore; a latch pivotally supported upon the aircraft structure; said landing gear assembly having a detent portion engaged by said latch; and actuating means connected to said eccentric pivot of said disc for imparting initial rotation to said eccentric pivot about said disc axis for the release of said latch from said detent portion without movement of said landing gear assembly and subsequently applying direct force from said actuating means to said disc without rotation of said eccentric pivot for the rotation of said landing gear assembly about said pivotal connection to the aircraft structure.

4. In a latching arrangement for a retractable landing gear; an aircraft structure; a spring-pressed latch pivotally mounted upon the aircraft structure; a movable landing gear assembly pivotally mounted upon the aircraft structure; said assembly having a detent portion arranged for engagement by said latch; said movable landing gear assembly having a cylindrical bore formed therewithin on an axis spaced from said pivotal mounting; extensible actuating means pivotally connected between said aircraft structure and said landing gear assembly for the sequential opening of said latch and the actuation of said movable landing gear assembly; sequence means including an element rotatably journaled within the said bore of said movable landing gear assembly operatively connected to said actuating means at a point within said bore but eccentric from the central axis of rotation of said rotatably journaled element; and power means for extending said actuating means arranged in such manner that the initial movement of said actuating means causes rotation of said eccentric connection about the axis of said rotatably journaled element and combined vertical and lateral movement of said extensible actuating means which disengages said spring-pressed latch from said detent portion of said movable landing gear assembly; and continued vertical extending movement of said actuating means imparts rotational movement to said movable landing gear assembly about its pivotal mounting for the retraction of the landing gear subsequent to its release from said spring-pressed latch.

5. Automatic latching mechanism for a pair of movable members pivotally mounted upon a supporting structure for partial rotation between two extreme positions including: means including a pair of latches disposed in the path of a second of said movable members in each said extreme position, rotatable lost-motion means including a disc element pivotally journaled within a bore formed in a first of said movable members on an axis spaced from the said pivotal mounting of said first movable member upon the supporting structure, and actuating means pivotally connected to said disc element on an axis displaced from the axis of said bore arranged in such manner that initial movement of said actuating means imparts rotation to said pivotal connection of said actuating means and rotation of said disc element about the center of said bore initiating unlatching of one of said latches at a first of said extreme positions, and continued movement of said actuating means imparts direct rotational movement of said disc element said pivotal connection of said actuating means and said first movable member in a first direction about the axis of the pivotal mounting of said first movable member upon the supporting structure, said second movable member being automatically locked at the extreme limit of said movement by a second of said latch means at a second extreme position, said actuating means arranged to rotate said disc element in the opposite direction to automatically unlatch said second latch means upon return movement of said actuating means in the opposite direction toward the first said position.

6. Latching mechanism for a retractable landing gear comprising: an aircraft structure; a latch operatively mounted upon the aircraft structure; landing gear means including a support member pivotally mounted upon the aircraft structure for extension and retraction of the landing gear; said landing gear means having a detent portion engageable in its extended position by said latch; means including a rockable element journaled within a bore formed within a portion of said support member spaced from said pivotal mounting; extensible actuating means having a pivotal connection to said rocking means on an axis eccentric with respect to said bore; operating mechanism connected to said latch; a portion of said actuating means engageable with said latch operating mechanism; and means for extending said actuating means such that initial extension imparts rotation to said eccentric pivotal connection about the axis of the bore of said rocking means causing said portion of said actuating means to engage said latch actuating mechanism for the opening of said latch and the unlocking of said landing gear means, and continued extension of said actuating means initiates rotation of said support member about its pivotal mounting upon the aircraft structure for the retraction of the landing gear.

7. Latching mechanism for a retractable landing gear comprising: an aircraft structure; a latch pivotally mounted upon the aircraft structure; landing gear means including a support member pivotally mounted upon the aircraft structure for extension and retraction of the landing gear; said landing gear means having a detent portion engageable in its extended position by said latch; lost-motion means including a cylindrical disc journaled within a bore having opposed stop portions formed within a portion of said support member spaced from said pivotal mounting; extensible actuating means pivotally supported upon the aircraft structure and having a pivotal connection to said lost-motion means on an axis eccentric with respect to said bore axis; operating mechanism connected to said latch; a cam portion carried by said actuating means engageable with said latch operating mechanism; and means for extending said actuating means such that initial extension imparts rotation to said eccentric pivotal connection causing said camming portion to engage said latch actuating mechanism for the opening of said latch and the unlocking of said landing gear means, and continued extension of said actuating means after said rotation has been arrested by said opposed stop portions imparts rotation to said support member about its pivotal mounting upon the aircraft structure for the retraction of the landing gear.

8. A latching arrangement for a retractable landing gear comprising: an aircraft structure; a bell-crank arm member pivotally mounted at an intermediate portion upon the aircraft structure; a main supporting strut having an intermediate portion pivotally connected to a first arm of said bell-crank member; a latch pivotally mounted upon said aircraft structure selectively engageable with an upper terminal of said main supporting strut; eccentric lost-motion means journaled within the second arm portion of said bell-crank member; said lost-motion means including a part-cylindrical bore having opposed stop portions formed within said second arm of said bell-crank member; extensible actuating means pivotally engaging said aircraft structure at one terminal and said lost-motion means eccentric of the axis of said part-cylindrical bore at its opposite terminal; and latch operating mechanism pivotally mounted upon said aircraft structure having a portion engageable by said actuating means for unlatching said upper terminal of said main supporting strut upon initial extension of said actuating means and rotational movement of its pivotal terminal eccentric of the axis of said part-cylindrical bore, further extension of said actuating means imparting direct movement of said second arm of said bell-crank member without further rotation of said lost-motion means for rocking said bell crank arm member about its intermediate pivotal connection upon said aircraft structure for rotation of said unlatched main supporting strut into a retracted position with respect to said aircraft structure.

LAWRENCE A. SMITH.
HOWARD F. GAMBLE.

References Cited in the file of this patent

UNITED STATES PATENTS

| Number | Name | Date |
| --- | --- | --- |
| 1,579,747 | Balzer | Apr. 6, 1926 |
| 2,053,886 | Williams | Sept. 8, 1936 |
| 2,294,467 | Lemonier | Sept. 1, 1942 |
| 2,374,146 | Waters | Apr. 17, 1945 |
| 2,403,802 | Katzberg | July 9, 1946 |
| 2,444,319 | Winter | June 29, 1948 |
| 2,464,972 | Franchi | Mar. 22, 1949 |
| 2,504,458 | Schmidt | Apr. 18, 1950 |

FOREIGN PATENTS

| Number | Country | Date |
| --- | --- | --- |
| 459,992 | France | Nov. 20, 1913 |